United States Patent [19]

Kennedy et al.

[11] Patent Number: 4,536,449

[45] Date of Patent: Aug. 20, 1985

[54] REACTION BONDED SILICON CARBIDE ARTEFACTS

[75] Inventors: Peter Kennedy, Preston; Kenneth Parkinson, Liverpool, both of England

[73] Assignee: United Kingdom Atomic Energy Authority, London, England

[21] Appl. No.: 644,359

[22] Filed: Aug. 27, 1984

[30] Foreign Application Priority Data

Sep. 7, 1983 [GB] United Kingdom ................ 8323994

[51] Int. Cl.³ .......................... B32B 9/00; C04B 33/34
[52] U.S. Cl. ........................................ 428/408; 264/60;
264/62; 264/332; 428/698
[58] Field of Search ............................ 264/60, 62, 332;
428/408, 698

[56] References Cited

U.S. PATENT DOCUMENTS

| | | | |
|---|---|---|---|
| 3,966,855 | 6/1976 | Hollenberg et al. | 264/332 |
| 4,148,894 | 4/1979 | Hillig et al. | 428/408 |
| 4,282,288 | 8/1981 | Yoshino et al. | 428/408 |
| 4,299,881 | 11/1981 | Luhleich et al. | 428/408 |
| 4,482,512 | 11/1984 | Alsop | 264/60 |

FOREIGN PATENT DOCUMENTS 2064499  9/1983  United Kingdom .

*Primary Examiner*—William J. Van Balen
*Attorney, Agent, or Firm*—Larson and Taylor

[57] ABSTRACT

A silicon carbide-silicon matrix composite incorporates unreacted coarse carbon particles (e.g. graphite particles) dispersed throughout the composite. The coarse particles are incorporated in a coherent mixture of carbon and silicon carbide powders which, after compaction, is infiltrated with molten silicon to form a matrix of reaction bonded silicon carbide in a substantially continuous free silicon carbide phase. By using coarse carbon particles of density of at least 0.963 g/ml, the molten silicon reacts only with the surfaces of those particles which may as a result remain unreacted and dispersed throughout the composite.

9 Claims, No Drawings

REACTION BONDED SILICON CARBIDE ARTEFACTS

BACKGROUND OF THE INVENTION

This invention relates to reaction-bonded silicon carbide artefacts.

Reaction-bonded silicon artefacts are produced by reaction sintering of a coherent mixture (or green body) of carbon and silicon carbide powders in the presence of molten silicon, the process being known as siliconising. Carbon in the mixture is converted to bonding silicon carbide and a substantially continuous silicon carbide matrix is formed in a substantially continuous free silicon phase.

FEATURES OF THE INVENTION

According to one aspect of the present invention a silicon carbide-silicon matrix composite incorporates unreacted particulate graphite dispersed throughout the composite.

According to a second aspect of the present invention graphite particles of density at least 0.963 g/ml are incorporated in a coherent mixture of carbon and silicon carbide powders and the coherent mixture is then siliconised to produce a reaction-bonded silicon carbide artefact having graphite particles dispersed therein.

The coarse carbon particle density of at least 0.963 g/ml is such that the particles resist permeation by silicon during siliconising. The particles are accordingly retained in the siliconised product where they have been found to improve lubricity by reducing sliding friction.

The ability of graphite of a density of at least 0.963 g/ml to resist permeation by silicon is already known and use has been made of this property to protect during siliconising the shape of a cavity formed in a green silicon carbide body, by the inclusion of a plug or former of dense graphite in the green body. In the present invention however the graphite is in particulate form and is dispersed throughout the green body comprising a coherent mixture of carbon and silicon carbide powders, or that part of the green body which is to provide a surface of improved lubricity.

Typically, the carbon powder of the coherent mixture will have a sub-micron particle size and is preferably in the form of colloidal graphite, will in contrast have a particle size (in the green mix) of at least 40 microns, more preferably at least 75 microns, typically in the range of 75–300 microns.

EXAMPLES ILLUSTRATING THE INVENTION

Example I 400 g of silicon carbide powder and 100 g of colloidal graphite powder were mixed with 48.8 g of graphite particles and a plastic binder. The mixture was formed under isostatic pressure at 103.5 MPa into a green body in which the graphite particles occupied 10% of the total volume of the green body. The graphite particle size ranged between 75 and 150 microns and the density was 1.73 g/ml. The green body was then heated to 1400°–1650° C. in the presence of molten silicon which reacted with the colloidal graphite, converting it to silicon carbide.

Example II

The experiment of Example I was repeated using larger dense graphite particles ranging in size from 150 to 300 microns.

Example III

The experiment of Example I was repeated with the volume occupied by the dense particles in the green body increased by doubling the quantity of these particles in the initial mixture with the silicon carbide powder and colloidal graphite.

The product from all three Examples was a reaction-bonded silicon carbide artefact having a substantially continuous free silicon phase and a matrix of silicon carbide through which the graphite particles were dispersed, the molten silicon having reacted only with the surface of these particles.

We claim:

1. A silicon carbide-silicon matrix composite incorporating unreacted coarse carbon particles dispersed throughout the composite.

2. A method of producing a reaction-bonded silicon carbide artefact comprising incorporating coarse carbon particles of density of at least 0.963 g/ml in a coherent mixture of carbon and silicon carbide powders and siliconising the mixture to produce a reaction-bonded silicon carbide artefact having carbon particles dispersed therein.

3. A method as claimed in claim 2 in which said coarse carbon particles are at least 40 microns in size.

4. A method as claimed in claim 3 in which said coarse carbon particles are at least 75 microns in size.

5. A method as claimed in claim 4 in which said coarse carbon particles are within a size range of 75 to 300 microns.

6. A method as claimed in claim 2 in which the carbon powder of said coherent mixture has a sub-micron particle size.

7. A composite according to claim 1 in which said coarse carbon particles comprise graphite particles.

8. A method according to claim 2 in which said coarse carbon particles comprise graphite particles.

9. An artefact made by the method of any one of claims 2–5 or 8.

* * * * *

Disclaimer 4,536,449.—*Peter Kennedy*, Broughton and *Kenneth Parkinson*, Wirral, United Kingdom. REACTION BONDED SILICON CARBIDE ARTEFACTS. Patent dated Aug. 20, 1985. Disclaimer filed Sept. 24, 1986, by the assignee, *United Kingdom Atomic Energy Authority*.

Hereby enters this disclaimer to claim 1 of said patent.

[*Official Gazette December 9, 1986.*]